US012372184B1

(12) United States Patent
Hsu

(10) Patent No.: US 12,372,184 B1
(45) Date of Patent: Jul. 29, 2025

(54) PIPE COUPLER WITH RETAINING RING STRUCTURE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/668,874

(22) Filed: May 20, 2024

(30) Foreign Application Priority Data

May 10, 2024 (TW) ................................. 113117460

(51) Int. Cl.
*F16L 37/40* (2006.01)
*F16F 1/12* (2006.01)

(52) U.S. Cl.
CPC .............. *F16L 37/40* (2013.01); *F16F 1/126* (2013.01); *F16K 2200/30* (2021.08)

(58) Field of Classification Search
CPC ........ F16L 37/40; F16K 2200/30; F16F 1/126
USPC ........................................... 251/337; 16/109
See application file for complete search history.

(56) References Cited

U.S. PATENT DOCUMENTS

| 2,754,112 | A * | 7/1956 | Pouell | B60G 17/021 |
| | | | | 267/286 |
| 5,839,468 | A * | 11/1998 | Allred | F16K 15/028 |
| | | | | 137/543.19 |
| 6,513,545 | B2 * | 2/2003 | Rhone | F16K 15/063 |
| | | | | 137/460 |
| 7,353,842 | B2 * | 4/2008 | Speer | F16K 15/044 |
| | | | | 137/538 |
| 8,707,981 | B2 * | 4/2014 | Edgeworth | G01F 15/08 |
| | | | | 137/542 |
| 9,777,850 | B1 * | 10/2017 | Handley | F16K 1/427 |
| 10,428,963 | B2 * | 10/2019 | Barreda | F16K 15/063 |

FOREIGN PATENT DOCUMENTS

| TW | M282084 U | 12/2005 |
| TW | M404921 U | 6/2011 |
| TW | M658957 U | 8/2024 |

OTHER PUBLICATIONS

Search Report dated Jan. 9, 2025 issued by Taiwan Intellectual Property Office for counterpart application No. 113117460.

* cited by examiner

*Primary Examiner* — Kevin F Murphy

(74) *Attorney, Agent, or Firm* — Demian K. Jackson; Jackson IPG PLLC

(57) ABSTRACT

A pipe coupler includes a tubular member internally defining a tubular passage communicable with a front opening and a rear pipe connector thereof; a valve head movably set in the tubular passage for openably sealing the front opening; a retaining ring fitted in the tubular passage adjacent to the rear pipe connector and including a hollow cylindrical section; and a return spring set in the tubular passage between the valve head and the retaining ring. The cylindrical section of the retaining ring has two circumferentially opposite free ends defining an elastically compressible gap between them, and an outer contact surface corresponding to an inner side of the tubular member. The tubular member is internally provided near the rear pipe connector with an annular groove, and the contact surface is provided with a round flange engaged with the annular groove to hold the retaining ring in place in the tubular member.

5 Claims, 4 Drawing Sheets

PIPE COUPLER WITH RETAINING RING STRUCTURE

This application claims the priority benefit of Taiwan patent application number 113117460 filed on May 10, 2024, the disclosure of which is hereby incorporated by reference in its entirety.

FIELD OF THE INVENTION

The present invention relates to a retaining ring structure, and more particularly, to a pipe coupler with retaining ring structure.

BACKGROUND OF THE INVENTION

Please refer to FIG. 1, there is shown a conventional retaining ring structure includes an annular retaining ring 1 having two circumferentially opposed free ends 10 to define a gap 12 between them. With the above arrangement, the conventional retaining ring 1 is elastically compressible or expandable at the two free ends 10 and accordingly, to be fitted to a corresponding position on an inner side or on an outer side of a corresponding tubular member (not shown). In the case of compressing the two free ends 10 of the conventional retaining ring 1 toward each other, the gap 12 is narrowed to allow placement of the retaining ring 1 on a corresponding position, such as an annular groove, in the tubular member. At this point, the retaining ring 1 is limited to the position in the tubular member.

The conventional retaining ring 1 with the above structure is used to axially fix various parts in different pipe couplers, such as a spring in the tubular member of the pipe coupler. It is noted the conventional retaining ring 1 is a thin, flat elastic element that tends to rotate in the pipe coupler and could not be stably held in place. Further, the conventional retaining rings 1 might be not inconsistent in shape due to different tolerances or specifications, which would lead to unsmooth flowing of fluid through the pipe coupler. When the conventional retaining ring 1 is used to limit the parts in the pipe coupler from moving axially, it is possible the spring could not be well pressed against the retaining ring 1 because inconsistent inner diameter tolerance of the retaining ring 1. At this point, additional supporting parts, such as washers, are required for placing between the spring and the retaining rings 1. This condition would disadvantageously increase the number of the parts for the pipe coupler.

It is therefore tried by the inventor to develop a pipe coupler with an improved retaining ring structure to solve the problems in the conventional retain ring and pipe coupler.

SUMMARY OF THE INVENTION

An object of the present invention is to provide a pipe coupler having a retaining ring structure capable of solving the above problems.

To achieve the above and other objects, the pipe coupler with retaining ring structure according to the present invention includes a tubular member, a movable valve head, a retaining ring, and a return spring. The tubular member has two open ends being a front opening and a rear pipe connector, and internally defines a tubular passage extending through the tubular member and communicating with the front opening and rear pipe connector. The tubular member is internally provided near the rear pipe connector with a circumferentially extended annular groove. The movable valve head is movably set in the tubular passage to seal the front opening. The return spring is set in the tubular passage between the movable valve head and the retaining ring. The retaining ring is fitted in the tubular passage adjacent to the rear pipe connector and includes a hollow cylindrical section extended axially by an axial length and having two circumferentially opposite free ends defining an elastically compressible gap between them and an outer contact surface corresponding to an inner side of the tubular member. The contact surface is provided with a circumferentially extended and radially protruded flange for engaging with the annular groove. And, the retaining ring internally defines a through bore, which is located at a radially inner side of the rear pipe connector.

In the present invention, the retaining ring structure does not have an influence on the smooth flowing of a fluid in the tubular passage and does not have the problem of non-consistent inner diameter tolerances. Therefore, the retaining ring structure of the present invention not only provides a supporting surface for the return spring to elastically press against, but also omits the need of providing additional supporting parts to thereby reduce the number of parts required by the pipe coupler.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof.

Figure 1:
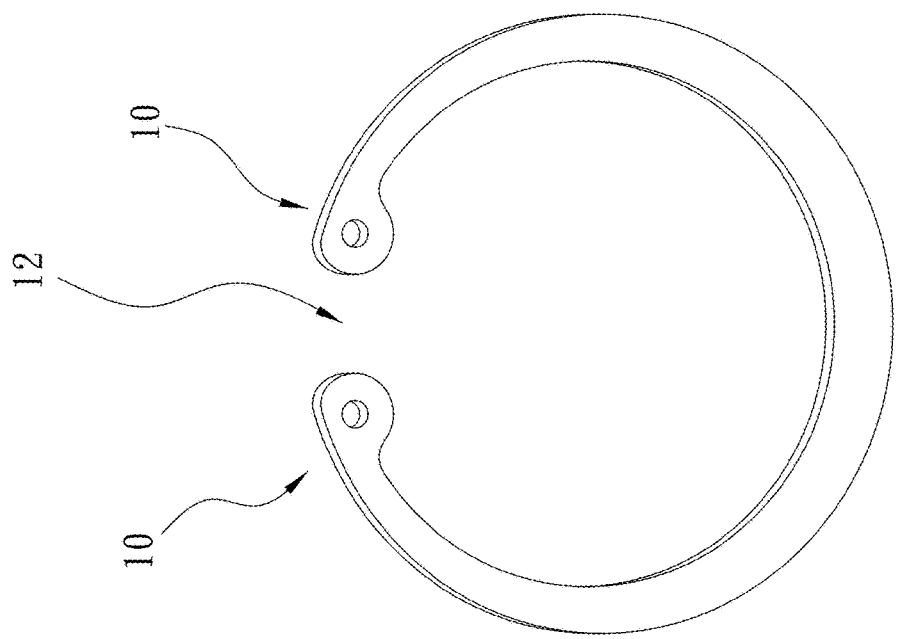
FIG. 1 is a perspective view of a retaining ring according to a conventional retaining ring structure.
Figure 2:
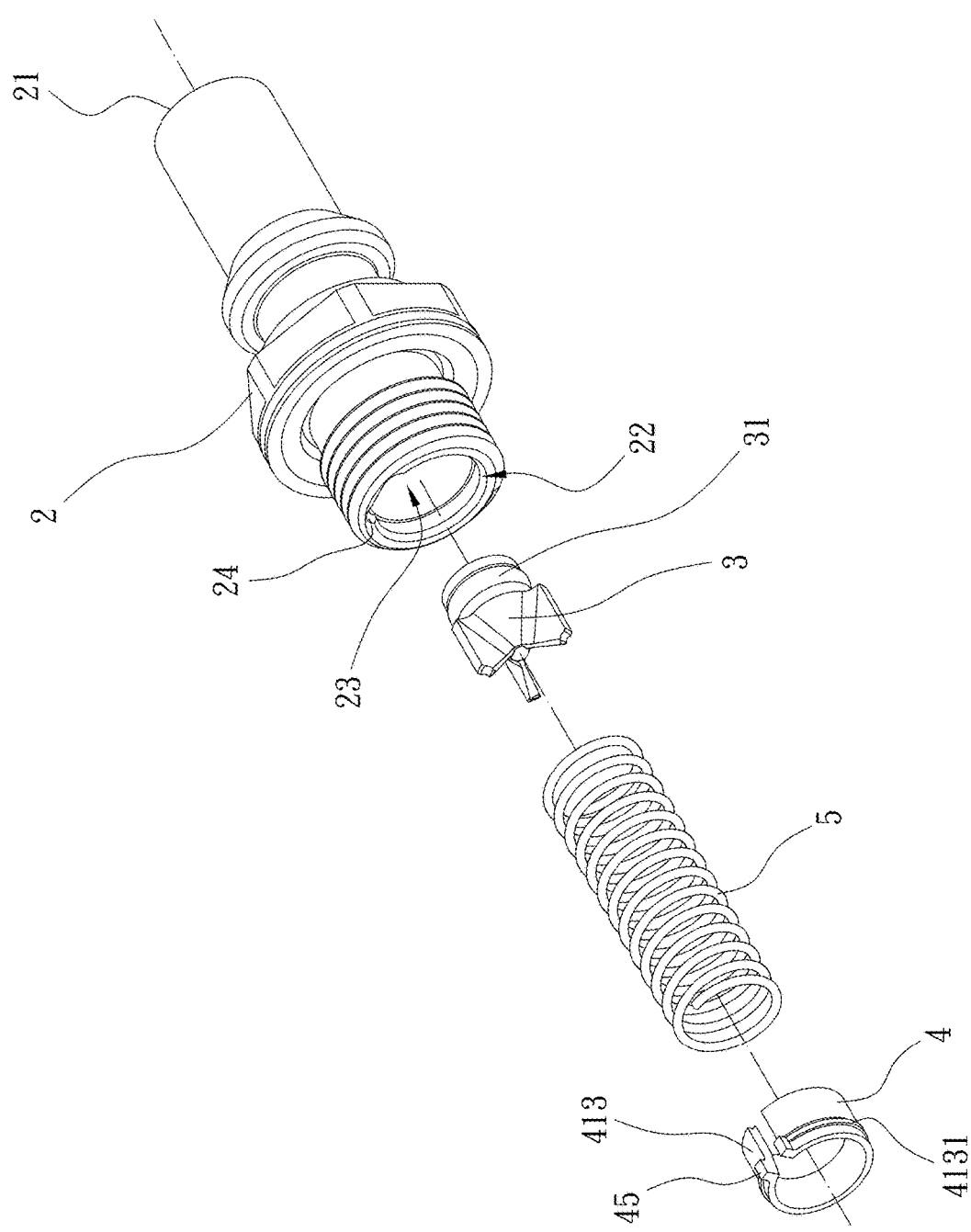
FIG. 2 is an exploded perspective view of a pipe coupler with retaining ring structure according to a preferred embodiment of the present invention.
Figure 3:
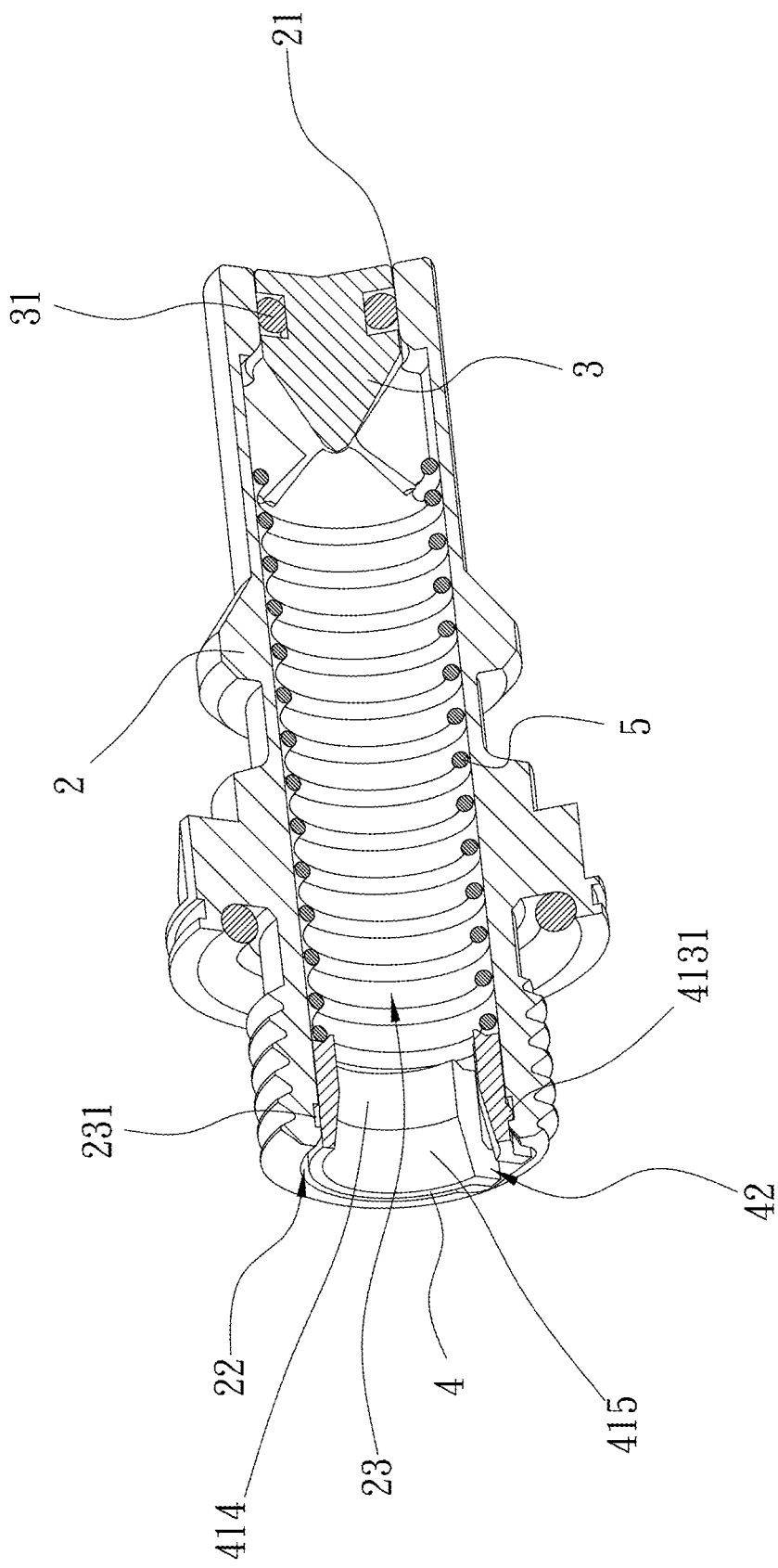
FIG. 3 is a cutaway view of the pipe coupler of FIG. 2.

Please refer to FIGS. 2 and 3, which are exploded perspective and cutaway views, respectively, of a pipe coupler with retaining ring structure according to a preferred embodiment of the present invention. For the purpose of conciseness, the present invention is also briefly referred to the pipe coupler herein.

As shown in FIGS. 2 and 3, the pipe coupler of the present invention includes a tubular member 2, a movable valve head 3, a retaining ring 4, and a return spring 5. The tubular member 2 has two open ends, which are defined as a front opening 21 and a rear pipe connector 22. The tubular member 2 internally defines a tubular passage 23 extending between and communicating with the front opening 21 and the rear pipe connector 22 for a fluid or a liquid such as water to flow through the tubular passage 23 via the rear pipe connector 22 and the front opening 21. In an embodiment, a pipe (not shown) can be connected to the pipe coupler of the present invention by fitting the pipe onto a rear side of the tubular member 2. When the front opening 21 of the tubular member 2 is opened, the fluid transported by the pipe can flow through the rear pipe connector 22 into the tubular passage 23 toward the front opening 21. Further, the tubular member 2 is internally provided near the rear pipe connector 22 with a circumferentially extended annular groove 231.

As shown in FIG. 3, the movable valve head 3 is movably set in the tubular passage 23 to openably seal the front opening 21. In an operable embodiment, the movable valve head 3 is located inside the tubular passage 23 corresponding to the front opening 21 of the tubular member 2. Since the movable valve head 3 and the tubular member 2 are set coaxially, the movable valve head 3 has an outer periphery matching an inner side of the tubular passage 23 to seal the front opening 21 and stop the fluid from flowing therethrough. The movable valve head 3 is externally provided around a front end with an O-ring 31 to provide enhanced sealing effect. When the movable valve head 3 is subjected to a push force against its front end, the movable valve head 3 is movable toward the rear side of the tubular member 2 to thereby open the front opening 21 and make the tubular passage 23 free for the fluid to flow through.

The return spring 5 is disposed in the tubular passage 23 and located between the movable valve head 3 and the retaining ring 4. In a preferred embodiment, the return spring 5 has two ends elastically pressed against a front end of the retaining ring 4 and a rear end of the movable valve head 3. Therefore, when the front end the movable valve head 3 is subjected to an external force to move rearward, the return spring 5 is elastically compressed by the rearward moved valve head 3; and when the external force applied to the movable valve head 3 is removed, the elastically compressed return spring 5 releases its elastic potential energy to push the movable valve head 3 toward the front end of the tubular member 2 to seal the front opening 21 again. Meanwhile, when the return spring 5 is elastically compressed, the external force applied to the return spring 5 is also transmitted to the retaining ring 4, against which the other end of the return spring 5 is elastically pressed.

Figure 4:
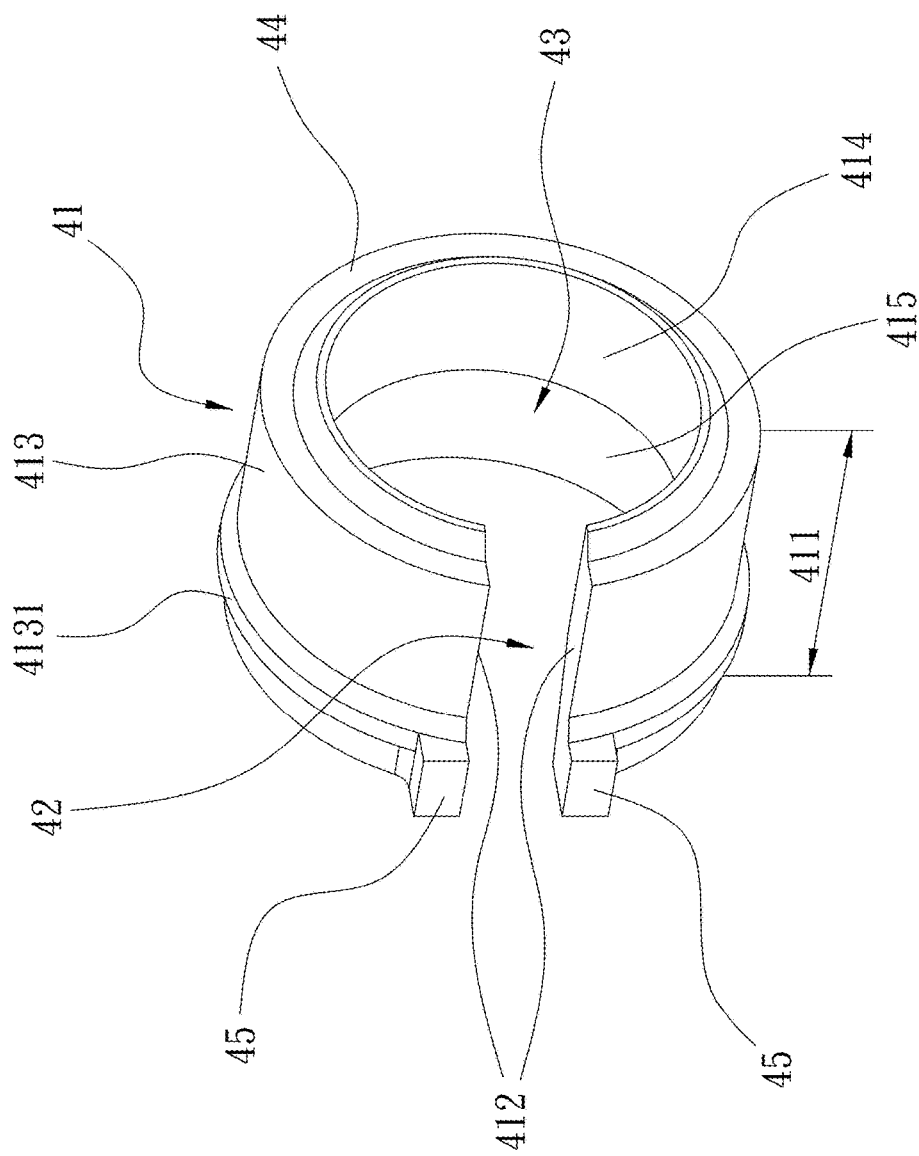
FIG. 4 is a perspective view of a retaining ring for the pipe coupler of the present invention.

The retaining ring 4 is fitted in the tubular passage 23 and located adjacent to the rear pipe connector 22. As can be seen in FIGS. 3 and 4, in an operable embodiment, the front end of the retaining ring 4 includes a supporting surface 44 facing toward the return spring 5. The supporting surface 44 at the front end of the retaining ring 4 is, for example, an annular surface defined between an outer and an inner diameter of the retaining ring 4 and located perpendicular to a central axis of the retaining ring 4 for supporting one end of the return spring 5 thereon. In the present invention, the return spring 5 has an end directly pressed against the supporting surface 44 of the retaining ring 4, such that the return spring 5 is axially limited from moving out of the tubular passage 23.

The retaining ring 4 is made of a material with elasticity, such as a metal material or a non-metal polymer, and is an annular member disposed coaxial with the tubular passage 23. The retaining ring 4 includes a hollow cylindrical section 41 extended axially by an axial length 411 and having two circumferentially opposite free ends 412, and an outer contact surface 413 corresponding to an inner side of the tubular member 2. The contact surface 413 is provided with a circumferentially extended and radially protruded flange 4131 for engaging with the annular groove 231. As an example, the flange 4131 may be formed as an external step on the hollow cylindrical section 41 having an outer diameter larger than that of the contact surface 413, and the step has a configuration corresponding to that of the annular groove 231. The two circumferentially opposed free ends 412 define an elastically compressible gap 42 between them. When the retaining ring 4 is compressed under an external force, the two free ends 412 are movable toward each other to narrow the elastically compressive gap 42, allowing the flange 4131 of the retaining ring 4 to be moved into the rear pipe connector 22 at the rear side of the tubular member 2. Further, it is noted the retaining ring 4 has an outer diameter larger than an inner diameter of the rear side of the tubular member 2. Therefore, the retaining ring 4 would exert a radial tension against the inner side of the tubular member 2 as soon as the retaining ring 4 is moved into the tubular member 2 and no longer subjected to the external force. As a result, the retaining ring 4 is firmly fitted in the tubular passage 23. At this point, the flange 4131 is located in the annular groove 231 in the relation of a mortise and tenon joint. When the return spring 5 has one end elastically pressed against the supporting surface 44, the force applied to the retaining ring 4 by the return spring 5 is stopped axially by the flange 4131 engaged with the annular groove 231. Therefore, the return spring 5 is axially retained in place in the tubular passage 23. In addition, since the contact surface 413 is extended axially by an axial length 411, the retaining ring 4 has increased contact area with the inner side of the tubular member 2 to be stably fitted in the tubular member 2 without the risk of rotating in the tubular member 2.

Further, the retaining ring 4 internally defines a through bore 43 located at a radially inner side of the rear pipe connector 22. The fluid flowing through the rear pipe connector 22 passes the through bore 43 toward the front opening 21. The fluid coming from the pipe flows through the rear pipe connector 22 and the through bore 43 of the retaining ring 4 into the tubular member 2, and then flows through the tubular passage 23 to the front opening 21, from where the fluid flows out of the pipe coupler. Moreover, the hollow cylindrical section 41 of the retaining ring 4 internally includes a straight section 414 located adjacent to the supporting surface 44 and a transition section 415 extended from the straight section 414 toward a rear end of the retaining ring 4 and having a diameter gradually expand toward the rear end of the retaining ring 4. Specifically, the through bore 43 located corresponding to the rear pipe connector 22 has a conical or forward tapered inner side for guiding the fluid to flow in a predetermined direction. By providing the straight section 414 and the transition section 415, the tubular passage 23 of the pipe coupler of the present invention is much smoother for fluid to flow through, compared to the conventional retaining ring 1 that tends to cause the problem of unsmooth flow passage in the pipe coupler.

In some other embodiments, the two circumferentially opposite free ends 412 of the hollow cylindrical section 41 are respectively provided with a radially outward lug 45. These lugs 45 enable a user to mount or replace the retaining ring 4 more conveniently. The lugs 45 are located at the rear end of the retaining ring 4 and can be moved closer to each other when an external force is applied thereto. The lugs 45 moved closed to each other would bring the two free ends 412 to move toward each other and compress the elastic compressible gap 42 to enable the fitting of the retaining ring 4 in the tubular passage 23 as described previously. Meanwhile, as shown in FIG. 2, the tubular member 2 is provided at its rear inner side near the rear side of the tubular member with receiving slots 24 corresponding to the two lugs 45. The receiving slots 24 are communicable with the rear pipe connector 22. When the retaining ring 4 is being fitted in the tubular member 2, the two lugs 45 can be aligned with joints of the receiving slots 24 and the rear pipe connector 22 to move into the receiving slots 24.

In conclusion, the retaining ring of the present invention eliminates the disadvantages in the conventional flat and flat retaining rings, such as inconsistent inner diameter tolerance, not suitable for the return spring to press against, and leading to bad axial locating effect of the return spring. With the present invention, it is unnecessary to use additional supporting element for the return spring, which would otherwise increase the number of parts used with the pipe coupler.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A pipe coupler with retaining ring structure, comprising:
    a tubular member having two open ends, which are defined as a front opening and a rear pipe connector; and the tubular member internally defining a tubular passage extending between and communicating with the front opening and the rear pipe connector, and being internally provided near the rear pipe connector with a circumferentially extended annular groove;
    a movable valve head being movably set in the tubular passage to openably seal the front opening;
    a retaining ring being fitted in the tubular passage and located adjacent to the rear pipe connector; the retaining ring including a hollow cylindrical section extended axially by an axial length and having two circumferentially opposite free ends and an outer contact surface corresponding to an inner side of the tubular member; the contact surface being provided with a circumferentially extended and radially protruded flange for engaging with the annular groove; the two circumferentially opposed free ends defining an elastically compressible gap between them; and the retaining ring internally defining a through bore, which is located at a radially inner side of the rear pipe connector; and
    a return spring being set in the tubular passage between the movable valve head and the retaining ring.

2. The pipe coupler with retaining ring structure as claimed in claim 1, wherein the retaining ring has a front end that provides a supporting surface facing toward the return spring; and the return spring having two ends elastically pressed against the supporting surface of the retaining ring and the movable valve head.

3. The pipe coupler with retaining ring structure as claimed in claim 2, wherein the hollow cylindrical section of the retaining ring internally includes a straight section located adjacent to the supporting surface of the retaining ring, and a transition section extended rearward from the straight section; and the transition section having a diameter that is expanded gradually toward a rear end of the retaining ring.

4. The pipe coupler with retaining ring structure as claimed in claim 1, wherein the two circumferentially opposite free ends of the hollow cylindrical section are respectively provided with a radially outward lug, and the two lugs being located at a rear end of the retaining ring; and the tubular member being provided on an inner side near a rear side of the tubular member with receiving slots communicable with the rear pipe connector for correspondingly receiving the two lugs therein.

5. The pipe coupler with retaining ring structure as claimed in claim 1, wherein the retaining ring has an outer diameter larger than an inner diameter of a rear side of the tubular member.

\* \* \* \* \*